UNITED STATES PATENT OFFICE.

FERDINAND SEMBRITZKI, OF HOLZMINDEN, GERMANY, ASSIGNOR TO HAARMANN & REIMER, OF HOLZMINDEN, GERMANY, A FIRM.

PROCESS OF OBTAINING IANTHONE AND IONONE.

SPECIFICATION forming part of Letters Patent No. 688,131, dated December 3, 1901.

Application filed September 18, 1900. Serial No. 30,434. (No specimens.)

*To all whom it may concern:*

Be it known that I, FERDINAND SEMBRITZKI, doctor of philosophy, a subject of the King of Prussia, Emperor of Germany, residing at Holzminden, in the Duchy of Brunswick, German Empire, have invented certain new and useful Improvements in Processes of Obtaining Ianthone and Ionone, of which the following is a specification.

The ketone known by the name "ianthone" is at present usually obtained, together with ionone, from citral or lippial. One kilogram of either citral or lippial is mixed with mesityl oxid and with the same weight of some suitable solvent, such as alcohol. To the mixture eighty cubic centimeters of a ten-per-cent. aqueous solution of sodium hydrate are added, whereupon the mass becomes heated, thereby indicating that condensation is in progress. After a few hours when the condensation has ended acetic acid is added to saturate the alkali and the undecomposed mesityl oxid. Citral or lippial is finally distilled off by steam. When cool, the condensation product is extracted by ether from the residue and the ethereal solution is distilled and rectified *in vacuo*. The resulting derivative of the aliphatic series is transformed into an isomerous odorous principle by means of acid condensing agents. A derivative of the tetrahydro-benzene group is thus formed, which derivative contains the ketones ianthone and ionone, and this mixture forms the raw material to be treated by the process hereinafter claimed. The boiling-point of ianthone lies between 162° and 172° centigrade at a pressure of fifteen millimeters above atmospheric pressure. The specific gravity is 0.943 at 22° centigrade. The refractive index is 1.53761.

This invention has reference to a process for the separation of certain ketone products, and of ionone and ianthone in particular. The process is based upon the action of phenyl-hydrazin and similar substitution products of ammonia upon ionone and ianthone, the former of which readily forms condensation products with such substitution products of ammonia, while the ianthone is not attacked at all or combines only with difficulty with the hydrazins. Thus it is possible to effect the separation of the ketone known under the name of "ianthone" from the simultaneously-formed ionone obtained by the condensation of citral and mesityl oxid and by the subsequent inversion of the resulting intermediate product. The action of phenyl-hydrazin and of hydrazins upon ketones of this class and in particular upon irone and ionone and the resulting formation of condensation products, from which after purification the ketones are again separated by acids, is well known; but the reaction does not apply or operates only very sluggishly with the ianthone.

As an instance of carrying out my invention I may use one hundred parts of crude ianthone, which are agitated with the faintly-acid solution of one hundred parts para-hydrazin-benzene-sulfonic acid and fifty parts of bicarbonate of soda in one thousand parts of water for ten hours. The mass is then rendered faintly alkaline with soda solution, thoroughly agitated with ether, and in case of the formation of an emulsion small quantities of sulfate of ammonia are added until the ether separates. The shaking with ether is then continued ten to twelve times. After the ether has been distilled off the ianthone remains free from ionone and may be further purified by rectification *in vacuo*. From the aqueous liquid the ionone may be separated by the addition of acid, such as one hundred and fifty parts phtalic acid or phtalic-acid anhydrid, and distilled by steam.

Although I have stated that para-hydrazin-benzene-sulfonic acid may be employed in treating the crude ianthone, I do not limit myself to that particular substitution product of ammonia, but desire it to be understood that similar substitution products of ammonia which have but slight chemical affinity for ianthone may also be used in my process.

What I claim, and desire to secure by Letters Patent of the United States, is—

1. A process for the separation of ionone from ianthone comprising the treatment of mixtures of these bodies with hydrazins, which combine with the ionone only, and subsequently separating the resulting condensation product of ionone from the unattacked ianthone, and recovering the ionone from such condensation products by acids, substantially as described.

2. A process for separating ionone from ianthone, which consists in treating the crude ketone mixture containing ionone and ianthone with a solution of para-hydrazin-benzene-sulfonic acid, separating the resultant condensation products from the unattacked ianthone, and recovering the ionone therefrom by acids.

3. A process for separating ionone from ianthone which consists in acting upon a mixture of ionone and ianthone with hydrazin in solution and in the presence of an alkali, and then extracting the ianthone from the resultant mass.

In witness whereof I have hereunto signed my name in the presence of two subscribing witnesses.

FERDINAND SEMBRITZKI.

Witnesses:
JULIUS SECKEL,
MARIE SCHINKE.